Oct. 29, 1929.                F. E. LOUDY                1,733,891
                        AIRPLANE GERERATOR MOUNT
                          Filed Sept. 12, 1927

INVENTOR
*Flavius E. Loudy*
BY
*Kwis Hudson & Kent*
ATTORNEYS

Patented Oct. 29, 1929

1,733,891

UNITED STATES PATENT OFFICE

FLAVIUS E. LOUDY, OF CLEVELAND, OHIO, ASSIGNOR TO THE GLENN L. MARTIN COMPANY, OF CLEVELAND, OHIO, A CORPORATION OF OHIO

AIRPLANE GENERATOR MOUNT

Application filed September 12, 1927. Serial No. 218,947.

This invention relates to improvements in airplanes, more particularly to improvements in the mounting of electric generators on airplanes.

In connection with radio apparatus for aircraft it is customary to employ an electric generator drive by a small air propeller. When the generator is functioning it is, of course, essential that the propeller be positioned outside the fuselage in order that it may be acted upon by the movement of the plane through the air. However, the generator is not in constant use, and during periods of non-use it is desirable to have it retracted into the body of the plane.

One of the objects of my invention, therefore, is the provision of a mounting for such an electric generator which will enable it to be quickly and easily moved from inoperative to operative position and vice versa, together with means for supporting and locking it in those positions.

A further object is the provision of means, preferably functioning automatically, for stopping the rotation of the propeller prior to the movement of the generator from operative to inoperative position.

Other objects and features of novelty will appear as I proceed with the description of that embodiment of the invention which, for the purposes of the present application, I have illustrated in the accompanying drawing, in which—

Figure 1:
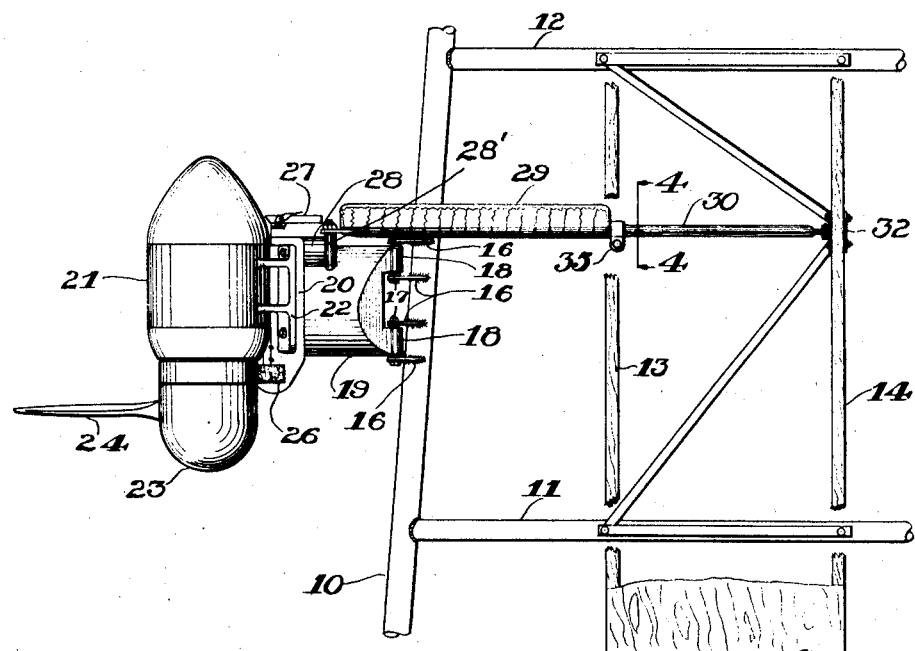
Fig. 1 is a plan view partly in section of a fragment of an airplane fuselage with my invention applied thereto, and illustrating the generator and its propeller in operative position.

In the drawing, portions of the frame of an airplane fuselage are indicated at 10, 11 and 12. Walkway stringers are also indicated at 13 and 14 and a portion of the walkway panel of the fuselage at 15. The longéron 10 has welded or otherwise attached thereto two pairs of lugs 16 in which are mounted pintles 17 that extend through eyes 18 formed at one end of a mounting 19 having a base or attaching flange 20. The generator 21 which is to be supported by the mounting 19 has feet 22 that are bolted to the base 20 of the mounting. The forward end of the generator shaft is provided with a head 23 carrying a propeller 24 consisting preferably of a single blade.

A rock shaft 25 is mounted upon the base 20 and has secured thereto at one end a brake shoe 26 and at the other end an operating handle 27. The mounting 19 has rigid therewith an extension arm 28 provided with a handle 28'. To the outer extremity of arm 28 there is pivotally connected one end of a telescoping brace 29, 30 both elements of which are constructed of tubing. The outer element 29 of the brace may be covered in such manner as to impart thereto a streamline form, as illustrated in Fig. 1. The opposite end of the brace is pivoted at 31 to a bracket 32 secured upon the stringer 14. Inter-engaging stops are secured to the brace elements 29 and 30 to limit the extensibility of the brace and thus to enable the brace to support the generator mounting. These stops comprise an internal ring 33 riveted to the tube 29 and an external ring 34 riveted to the tube 30. The tube 29 at its inner end is split and flanged to constitute a clamp. The flanges may be caused to approach each other to accomplish the clamping action by means of a bolt 35 extending through aligning holes in the flanges, said bolt having a collar 36 to engage one flange and a threaded extremity to engage internal threads in the other flange. A handle 37 provides a convenient means for adjusting the bolt.

Figure 2:
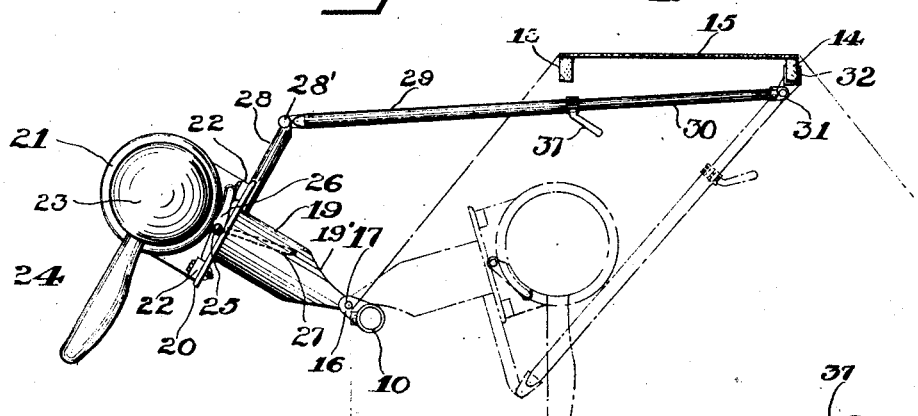
Fig. 2 is a view partly in vertical transverse section showing the generator and cooperating parts in front elevation.
Figure 3:
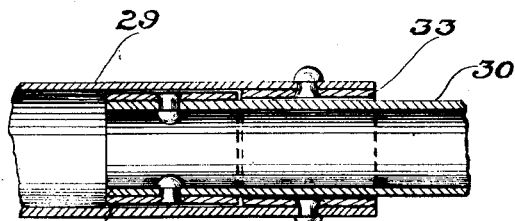
Fig. 3 is a longitudinal sectional view showing the two parts of an extensible brace for the generator mounting, the brace being illustrated in its furthest extended position.
Figure 4:
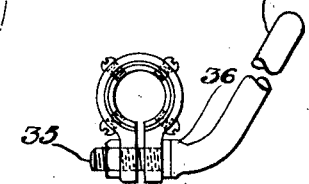
Fig. 4 is a cross section of the brace taken substantially on the line 4—4 Fig. 1 illustrating the clamp for holding the two parts in locking relation.

Assuming that the parts are in inoperative position, as illustrated by dotted lines in Fig. 2, and that it is desired to operate the generator, the cover (not shown) over the opening between the longéron 10 and stringer 13 is withdrawn. The handle 37 is then turned to loosen the clamping bolt 35. The generator mounting is now grasped by the handle 28' and swung about the pintles 17 until the parts come into the position illustrated in full lines in Figs. 1, 2 and 3. In this position the rings 33 and 34 engage and the brace 29, 30 supports the mounting. Preferably, also, the handle 37 is turned to clamp the two telescoping parts 29 and 30 together, whereby the generator is prevented from moving inwardly as well as outwardly. When the use of the generator is to be discontinued, the operator first loosens clamping bolt 35 and grasps handle 27 and lifts it thereby swinging brake shoe 26 into contact with the rotating head 23 of the propeller and stopping the same, the brake being so operated as to bring the blade 24 of the propeller to a standstill in an angular position somewhere near that shown in dotted lines in Fig. 2, so that the blade may not strike the stringer 13 as the generator is swung past the latter and in order that the blade may be out of the way of the closure when the generator is in inoperative position. Pulling on handle 28' serves to swing the mounting inwardly, and the latter movement is continued until the parts come into the dotted-line position with a curved surface 19' of the mounting 19 resting upon the longéron 10. The handle 37 is then again turned to tighten the clamping bolt 35 and the cover for the opening in the fuselage may be put back in place.

By reason of the construction herein illustrated and described, the mounting of the generator may be supported on a long enough strut to space it satisfactorily from the fuselage, and at the same time the opening in the fuselage through which the unit must travel need not be large. As a matter of fact, the transverse dimension of this opening is frequently limited, as it is in the present instance, by the distance between longéron 10 and walkway stringer 13, and hence the opening is necessarily small.

Having thus described my invention, I claim:

1. In an airplane, a fuselage having an opening in the side thereof, an electric generator provided with a propeller drive, a mounting for said generator hinged to the fuselage adjacent said opening, whereby said generator may be swung into operative position outside said fuselage or into inoperative position within the fuselage, and an adjustable brace for locking said mounting in either of said positions.

2. In an airplane, a fuselage having an opening in the side thereof, an electric generator provided with a propeller drive, a mounting for said generator hinged to the fuselage adjacent said opening, whereby said generator may be swung into operative position outside said fuselage or into inoperative position within the fuselage, an extensible brace pivotally connected with said mounting and said fuselage, and means for locking said brace in different degrees of extension, whereby said mounting may be supported in either of said positions.

3. In an airplane, a fuselage having an opening in the side thereof, an electric generator provided with a propeller drive, a mounting for said generator hinged to the fuselage adjacent said opening, whereby said generator may be swung into operative position outside said fuselage or into inoperative position within the fuselage, a brace pivotally connected with said mounting and said fuselage, said brace comprising two telescoping parts, and a clamp for locking said telescoping parts together.

4. In an airplane, a fuselage having an opening in the side thereof, an electric generator provided with a propeller drive, a mounting for said generator hinged to the fuselage adjacent said opening, whereby said generator may be swung into operative position outside said fuselage or into inoperative position within the fuselage, a brace pivotally connected with said mounting and said fuselage, said brace comprising two telescoping parts, and a pair of stops on said parts to limit the extensibility of the brace and support said mounting in operative position.

In testimony whereof, I hereunto affix my signature.

FLAVIUS E. LOUDY.